UNITED STATES PATENT OFFICE.

JOSEPH SIGLER, OF ANDERSON, INDIANA, ADMINISTRATOR OF THE ESTATE OF JESSE P. CRAMPTON, DECEASED.

IMPROVEMENT IN THE MANUFACTURE OF BUTTER.

Specification forming part of Letters Patent No. 70,417, dated November 5, 1867; antedated October 29, 1867.

*To all whom it may concern:*

Be it known that JESSE P. CRAMPTON, of Anderson, in the county of Madison and State of Indiana, did invent a new and useful Process of Improving Butter; and I, JOSEPH SIGLER, Administrator of said JESSE P. CRAMPTON, deceased, do hereby declare that the following is a full, clear, and exact description thereof.

The invention of said JESSE P. CRAMPTON relates to the improvement of common butter by churning it over, in combination with new or sweet milk, and certain other ingredients, whereby the quantity of butter is increased, and its quality, in respect to remaining sweet and palatable, and not becoming rancid, is greatly improved.

To enable others skilled in the art to make and use said invention, I will proceed to describe it.

To one gallon of sweet milk is added eight pounds (avordupois) of butter, one ounce of loaf-sugar, twenty grains (troy) of nitrate of potash, one fluid ounce of liquid rennet, and ten grains (troy) of annetto. These are mixed and churned together in the same manner as cream in the common process of making butter. After the butter is seperated from the milk by the process of churning, it is gathered and worked in the usual manner. The chemicals and butter added to the milk cause a speedy separation of the butter globules from it, causing it to yield all or nearly all that it contains, and producing an article of good quality and flavor. The annetto simply gives the butter a yellowish color, and having heretofore been used for a similar purpose, no claim is made to it separately considered.

What is claimed as new, and desired to be secured by Letters Patent, is—

The method, herein described, of improving common butter by churning it over, in combination with new or sweet milk, white sugar, nitrate of potash, and liquid rennet, or their equivalents, substantially in the manner and in the proportions herein set forth.

JOSEPH SIGLER,
*Admr. of the estate of J. P. Crampton, dec'd.*

Witnesses:
RICHARD LAKE,
WM. CRIM.